3,415,686
FUEL CELL ELECTROLYTE COMPRISING AN ALKALI METAL TUNGSTATE

Joseph A. Shropshire, Westfield, and Barry L. Tarmy, Berkeley Heights, N.J., assignors to Esso Research and Engineering Company, a corporation of Delaware
No Drawing. Filed June 26, 1963, Ser. No. 290,621
1 Claim. (Cl. 136—86)

This invention relates to the electrochemical conversion of chemical energy to electrical energy. In particular, this invention relates to a novel fuel cell and to a novel process for the operation of a fuel cell employing an electrolyte soluble cataylst. More particularly, this invention relates to the use of the element tungsten in soluble form in fuel cell electrolytes.

The term fuel cell as used herein and in the art, defines a device, system, or apparatus wherein chemical energy of a combustible fuel is converted to electrical energy at a nonsacrificial or inert electrode. The true fuel cell is adapted for continuous use and is supplied with both fuel and oxidant sources outside the cell proper. Such cells include at least two electrodes. One of such electrodes will function as an anode and the other will function as a cathode. The electrodes are separated by an electrolyte which provides for ionic conductance between said anode and cathode. The electrodes are in electrical communication by conduction means external to the electrolyte. The fuel cell is fitted with means for admitting a fluid fuel into contact with the anode, means for admitting fluid oxidant into contact with cathode and means for removing products, such as $CO_2$ and water formed during the reaction, from the fuel cell. Where necessary or desired the electrolyte compartment can be divided into an anolyte chamber and a catholyte chamber by an ion-permeable partition or ion-exchanged membrane. Thus, in such cells a fuel is oxidized at the anode giving up electrons and an oxidant is reduced at the cathode upon receiving the electrons which were given up at the anode. Fuel cells wherein the fuel is anodically oxidized to its partial oxidation products such as ketones, alkyl radicals and acids are well known in the art. It is also known in the art that compounds such as ketones, alkyl raicals and acids may be produced by anodic oxidation of hydrocarbons in power driven cells. Power driven cells differ from a normal fuel cell in that electrical current is supplied by an outside power source to a power driven cell; i.e., power is supplied to, rather than derived from the cell.

It is one object of this invention to provide a highly efficient electrolyte for use in both fuel cells and power driven cells. Such electrolyte comprises aqueous sulfuric acid saturated with a soluble tungsten compound.

It is an object of this invention to provide a novel electrode-electrolyte system comprising a platinum electrode having a pre-adsorbed layer of a rhenium compound, immersed in an electrolyte comprising sulfuric acid saturated with a soluble tungsten compound for use in both a fuel cell and a power driven cell.

These and other objects of this invention will be set forth in the description hereinafter.

Hydrogen, carbon monoxide, hydrocarbons and oxygenated hydrocarbons can be used as fuels in conjunction with the novel electrolyte and electrode-electrolyte system of this invention. Such fuels are well recognized in the art as being sources of chemical energy for the production of electrical energy in a fuel cell. For instance, U.S. Patent 2,384,463 issued to Gunn et al. discloses gaseous fuels suitable for use in a fuel cell. Such fuels include hydrogen, carbon monoxide, methane, ethylene, propane, butane, isobutylene, water gas, producers gas, illuminating gas, natural gas and liquid fuels including petroleum, the many derivatives and products of petroleum, the broad class of hydrocarbon and the oxygenated derivatives thereof such as alcohols. In another example of the prior art, U.S. Patent 2,925,454, issued to Justi et al., there is claimed as fuels liquid organic compounds such as alcohol, ketones, ethers, paraffins and aromatic hydrocarbons having not more than 14 carbon atoms per molecule.

This invention may be advantageously practiced with any fluid fuel suitable for use in conventional fuel cells employing an aqueous electrolyte.

When an organic fuel is employed as a primary fuel, the efficiency of the fuel cell is enhanced by achieving an electro-chemical reaction where the oxidation proceeds rapidly to completion yielding carbon dioxide and water with the release of electrons to the anode. Efficiency of operation for the generation of power is thereafter enhanced by minimizing the formation of oxidation products. Heretofore in cells operating at relatively low temperatures, that is temperatures up to about 350° F., efforts to increase efficiency of electrochemical oxidation have concentrated upon improving catalysts impregnated or impressed upon the electrodes. In cells employing strong acid electrolytes such as sulfuric and phosphoric acids this has meant that the catalyst must be a noble metal in order for the catalyst not to be attacked by the electrolyte.

It has now been discovered that the efficiency of power generating fuel cells or power consuming, electrolytic cells is surprisingly improved by the presence of a soluble tungsten compound in the electrolyte of such cells. The advantages obtained by using a soluble tungsten compound in the electrolyte are particularly applcable when anodically oxidizing an organic fuel. Efficiency is notably increased when an electrolyte of this invention is used in conjunction with an anode comprising platinum with rhenium oxide adsorbed thereon. The anodes for the fuel oxidation of this invention can be a conventional grid, plate, screen on porous body having platinum on the surface or such anode being entirely of the metal platinum. The platinum surface may be obtained by depositing platinum from a solution of its salts upon the surface by electrolytic or chemical reduction.

The soluble tungsten compound is employed in saturation concentrations in the electrolyte. The amount of tungsten compound will normally be less than about 0.4 wt. percent. An electrolyte saturated with a soluble tungsten compound can be used in a cell employing a common and undivided electrolyte, i.e., without physical separation between the anode and cathode or it may be added to the anolyte or to both the anolyte and catholyte of cells employing a porous barrier between the anode and cathode.

The aqueous electrolytes that can be used in the practice of this invention are acids such as $H_2SO_4$, $H_3PO_4$. The aqueous electrolyte can be effectively employed in concentrations between about 5 and 50 wt. percent for sulfuric acid and concentrations up to about 95 wt. percent for phosphoric acid.

The soluble tungsten compounds that can be used to saturate the electrolyte are the alkali metal tungstates, such as sodium tungstate, potassium tungstate and lithium tungstate.

The rhenium compounds that can be used upon the electrodes of this invention include: sodium and potassium perrhenates, rhenium trichloride and rhenium heptoxide.

The invention will be more easily understood from the following examples which are for the purposes of illustration only and should not be construed as limitations upon the true scope of the invention as set forth in the claim.

Example 1

The effect of adding a soluble tungsten compound to the anolyte of a fuel cell was tested. Sodium tungstate was added until the electrolyte solution was saturated. The electrolyte employed was 30 wt. percent sulfuric acid. The fuel used was 1 M methanol. The electrolyte temperature was maintained at about 82° C. A platinum screen having impressed thereon $NaBH_4$— reduced platinum was used as the fuel electrode. A similar cell with the exception that the electrolyte contained no tungsten was run so as to determine the effect of the soluble tungsten compound on the oxidation. The results obtained are set forth in the following table.

TABLE I

| System | Volts polarization from standard $H_2$ electrode at indicated ma./cm.$^2$ | | | | |
|---|---|---|---|---|---|
| | 0 | 1 | 10 | 50 | 100 |
| Pt black ($NaBH_4$) 30% $H_2SO_4$ sat'd $H_2WO_4$ 1 M $CH_3OH$, T=82° C. (Tungsten put in as $Na_2WO_4$) | 0.16 | .30 | .47 | .52 | .56 |
| Pt black (typical) 30% $H_2SO_4$ 1 M $CH_3OH$ T=82° C. (no Tungstate) | 0.20 | .46 | .53 | .59 | .6 |

It is apparent that the tungsten gives an improvement.

Example 2

The effect of the electrolyte system of this invention was tested. The electrode comprised a platinum wire screen having $NaBH_4$ reduced platinum thereon. The electrode was activated prior to immersion in the fuel cell electrolyte by immersing the electrode in a solution comprising 30 wt. percent sulfuric acid and 0.1 wt. percent $Re_2O_7$ and having one mole/liter of methanol therein. The electrode was kept immersed in the solution for about seven minutes. The fuel cell electrolyte consisted of 30 wt. percent sulfuric acid saturated with $Na_2WO_4$. During the operation of the cell, the electrolyte temperature was maintained at 82° C. A similar cell was run so as to determine the effect of the electrode-electrolyte system on the oxidation of a fuel. This second cell utilized a platinum screen having platinum black thereon, an electrolyte of 30 wt. percent sulfuric acid and was also operated at 82° C. Both cells employed 1 molar methanol as the fuel. The results obtained are set forth in the following table.

TABLE II

| System | Volts polarization from standard $H_2$ electrode at indicated ma./cm.$^2$ | | | | |
|---|---|---|---|---|---|
| | 0 | 1 | 10 | 50 | 100 |
| Standard: Pt black 30% $H_2SO_4$ 1 M $CH_3OH$ T=82° C | 0.20 | .46 | .53 | .59 | .62 |
| Pt black ($NaBH_4$) 1 M $CH_3OH$, 30% $H_2SO_4$ sat'd $H_2WO_4$, 82° C. (introduced as $Na_2WO_4$) $H_2SO_4$—1M $CH_3OH$—0.1% $Re_2O_7$ | 0.24 | .27 | .37 | .43 | .47 |

It is apparent that this system produces practical current densities at about 150 millivolts less polarization than the standard platinum black catalyst.

What is claimed is:
1. In a fuel cell the improvement in combination therewith comprising an electrolyte of about 5 to 50 wt. percent sulfuric acid saturated with an alkali metal tungstate and an anode comprising a platinum support having thereon a layer of a member selected from the group consisting of sodium perrhenate, potassium perrhenate, rhenium trichloride, and rhenium heptoxide.

References Cited

UNITED STATES PATENTS

| | | | |
|---|---|---|---|
| 3,000,996 | 9/1961 | Usel | 136—9 |
| 3,134,697 | 5/1964 | Niedrach | 136—86 |
| 3,245,890 | 4/1966 | Klass | 136—86 X |

WINSTON A. DOUGLAS, *Primary Examiner.*

H. FEELEY, *Assistant Examiner.*

U.S. Cl. X.R.

136—154